United States Patent [19]

Maruno et al.

[11] Patent Number: 4,684,842
[45] Date of Patent: Aug. 4, 1987

[54] GAS PRESSURE TRANSDUCER

[75] Inventors: Naohiko Maruno; Masakazu Abe; Tetsuo Ogawa, all of Tokyo, Japan

[73] Assignee: Nagano Keiki Seisakusho, Ltd., Tokyo, Japan

[21] Appl. No.: 918,350

[22] Filed: Oct. 14, 1986

[30] Foreign Application Priority Data

Mar. 28, 1986 [JP] Japan .................................. 61-71861

[51] Int. Cl.⁴ ............................................ H01L 41/08
[52] U.S. Cl. ..................................... 310/316; 73/700; 73/754
[58] Field of Search ............... 310/314, 316, 317, 319; 73/16, 4 R, 23, 24, 37, 28–30, 700, 704, 712, 754, DIG. 4

[56] References Cited

U.S. PATENT DOCUMENTS

| 3,432,691 | 3/1969 | Shoh ................................... 310/316 |
| 3,447,051 | 5/1969 | Attwood et al. ............... 310/316 X |
| 3,586,936 | 6/1971 | McLeroy ........................ 310/316 X |
| 3,819,961 | 6/1974 | Bourgeois et al. .................. 310/316 |
| 3,967,143 | 6/1976 | Watanabe et al. .................. 310/316 |
| 4,302,728 | 11/1981 | Nakamura ....................... 310/316 X |
| 4,468,581 | 8/1984 | Okada et al. .......................... 310/316 |

OTHER PUBLICATIONS

Ultrasonic Pressure & Frequency Analyzer, by Modlo and Moore, IBM Technical Disclosure Bulletin, vol. 14, No. 3, Aug. 1971, pp. 850–851.

Primary Examiner—Mark O. Budd
Attorney, Agent, or Firm—Bogucki, Scherlacher, Mok & Roth

[57] ABSTRACT

A gas pressure transducer has a voltage stabilizer for supplying a piezoelectric crystal in a gas with an AC constant-voltage signal corresponding to an applied AC signal and having a constant peak amplitude. An alternating output current from the piezoelectric crystal is converted by a current-to-voltage converter into an AC voltage, which is shifted in phase by a phase shifter so that the impedance of the piezoelectric crystal is minimal or nearly minimal under the resonant condition. The shifted AC voltage is then applied to the voltage stabilizer. The piezoelectric crystal, the voltage stabilizer, the current-to-voltage converter, and the phase shifter jointly constitute a self-excited oscillation loop. Since the amplitude of the AC voltage from the current-to-voltage converter is uniquely dependent on the pressure of the gas, the gas pressure can be known from a DC voltage produced by rectifying the AC voltage.

6 Claims, 8 Drawing Figures

GAS PRESSURE TRANSDUCER

BACKGROUND OF THE INVENTION

1. Field of the Invention

The present invention relates to a gas pressure transducer employing a piezoelectric crystal or quartzcrystal resonator with its impedance variable dependent on a gas pressure applied thereto.

2. Description of the Relevant Art

It is known that there is a definite correlation between the pressure of a certain gas and the impedance of a piezoelectric crystal, i.e., a quartz-crystal resonator, placed in the gas while the piezoelectric crystal is in a state of series resonance. Once the relationship between the pressures of gases and the impedances of a piezoelectric crystal is determined, the pressure of a gas of a known composition can be derived from the impedance of the piezoelectric crystal. A gas pressure transducer based on the above principle has already been put to use.

To determine the impedance of a piezoelectric crystal, it is generally required to use an oscillator circuit which applies an AC signal to the piezoelectric crystal. Two types of oscillator circuits, i.e., a self-excited oscillator circuit and a separately excited oscillator circuit, are normally used.

The self-excited oscillator circuit is widely used in the field of watches, clocks, and the like for highly accurate frequency oscillation. However, this oscillator circuit design fails to quantitatively and highly accurately determine the impedance of a piezoelectric crystal in a state of series resonance dependent on the pressure of a gas, as in a gas pressure transducer. Therefore, any suitable gas pressure transducer with a self-excited oscillator circuit has not yet been put to practical use.

For the reason described above, conventional gas pressure transducers mainly utilize separately excited oscillator circuits. According to one simplest gas pressure transducer of such a configuration, an AC voltage having a series-resonant frequency that is generated by a frequency regulator is applied to a pressure sensor comprising a piezoelectric crystal, and a current which flows through the piezoelectric crystal and has a magnitude depending on a gas pressure applied thereto is processed by a current-to-voltage converter and a rectifier to display the detected pressure. However, the resonant frequency of the piezoelectric crystal varies as the applied gas pressure changes, and drifts even due to slight contamination to which the piezoelectric crystal is subjected. Furthermore, different piezoelectric crystals have different resonant frequencies. The gas pressure transducer of this design is not practical in that the frequency regulator should be operated at all times to seek the resonant frequency while the pressure is being measured.

Japanese Laid-Open Patent Publication No. 60 (1985)-201225 discloses a gas pressure transducer which employs a separately excited oscillator circuit to eliminate the aforesaid drawbacks. The disclosed gas pressure transducer has an ability to automatically lock onto or track the resonant frequency. The gas pressure transducer includes a PLL (phase-locked loop) circuit as follows: A frequency control circuit with its frequency controlled by an applied input voltage is connected to a piezoelectric crystal to apply an AC voltage thereto. The output signal from the frequency control circuit and an output signal produced by a current-to-voltage converter connected to the output terminal of the piezoelectric crystal are compared in phase, and an output voltage corresponding to any phase difference is applied through a low-pass filter to the frequency control circuit. The frequency control circuit therefore applies to the piezoelectric crystal an AC voltage having a frequency which is equal to the resonant frequency of the piezoelectric crystal. As a result, there is no need for the operator to seek the resonant frequency with a frequency regulator.

The above gas pressure transducer still has its own shortcomings resulting from the separately excited oscillator circuit, i.e., the PLL circuit. More specifically, since the piezoelectric crystal has an extremely high Q, it is necessary to search for the resonant frequency by frequency sweep when the power supply is turned on. The frequency control circuit requires special circuitry for such frequency sweep. The gas pressure transducer is not suitable for quick pressure measurement since it does not operate immediately, but with a certain time delay, after the power supply is turned on. A certain capture range is normally set in the frequency control circuit for seeking the resonant frequency. If the capture range were too wide, the circuit would be susceptible to extraneous noise. If the capture range were too narrow, the circuit would be unable to lock onto the resonant frequency in the event that the resonant frequency drifted. Another problem is that there is a delay in the response to a time-dependent change in the measured pressure because of the time constant of the low-pass filter in the PLL circuit. Reducing the time constant would also make the circuit susceptible to extraneous noise.

SUMMARY OF THE INVENTION

It is an object of the present invention to provide a gas pressure transducer of the self-excited oscillation type which will eliminate the deficiencies with the conventional gas pressure transducers of the separately excited oscillation type, i.e., which will operate immediately, without a time delay, after the power supply is turned on, for quick pressure measurement, and has improved response attained by not using a circuit component such as a low-pass filter.

Another object of the present invention is to provide a gas pressure transducer which employs a phase shifter means for setting an optimum phase condition to enable a piezoelectric crystal to oscillate securely in the vicinity of an electrically series-resonant frequency for the detection of a minimum impedance value, and which is resistant to disturbances such as extraneous noise and temperature-induced drifts for much stabler operation.

Still another object of the present invention is to provide a gas pressure transducer which has a simple circuit arrangement is low in cost, small in size, lightweight, and highly reliable in operation.

The above objects can be accomplished by a gas pressure transducer using a self-excited oscillation circuit including a piezoelectric crystal, which would not oscillate, in principle, if the piezoelectric crystal were removed. The gas pressure transducer of the invention is essentially different from that of the separately excited oscillation type which would keep on oscillating if the piezoelectric crystal were removed. The gas pressure transducer of the invention has a self-excited oscillation loop comprising a voltage stabilizer means for supplying a sensor or a piezoelectric crystal with an AC constant-voltage signal synchronizing with an applied AC signal and having a constant peak amplitude, a current-to-voltage converter means for converting an alternating output current from the piezoelectric crystal into an output voltage signal, and a phase shifter means for shifting the phase of the output voltage signal from the current-to-voltage converter means so that the impedance of the piezoelectric crystal is minimal or nearly minimal and for supplying the shifted voltage signal to the voltage stabilizer means. The gas pressure transducer additionally includes a measurement section having an output means for issuing out the output voltage signal from the current-to-voltage converter means as information representing the pressure of the gas.

Oscillating conditions of the loop include a phase condition which is met by selecting the phase shift provided by the phase shifter means so that the piezoelectric crystal oscillates in the vicinity of an electrically series-resonant frequency, and a gain condition which can be met by the gain adjusting capability of the voltage stabilizer means.

The self-excited oscillation loop supplies the AC constant-voltage signal at all times to the piezoelectric crystal to enable the latter to oscillate in the vicinity of the electrically series-resonant frequency and to have an impedance as a function of the gas pressure. The AC voltage signal from the current-to-voltage converter means has an amplitude proportional to the reciprocal of the impedance of the piezoelectric crystal, i.e., the admittance of the latter. Therefore, the gas pressure can be derived from the AC voltage signal from the current-to-voltage converter means through the output means which includes an indicator.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENTS

A gas pressure transducer according to one preferred embodiment of the present invention will first be described with reference to FIGS. 1 and 2.

Figure 1:
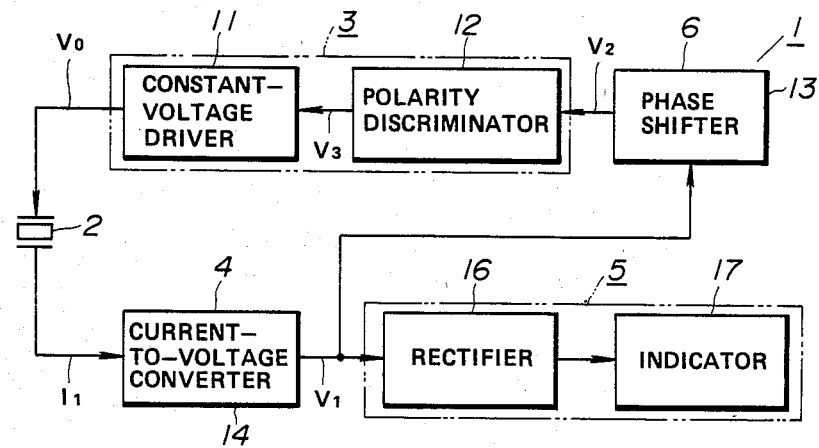
FIG. 1 is a block diagram of a gas pressure transducer according to the present invention.
Figure 2:
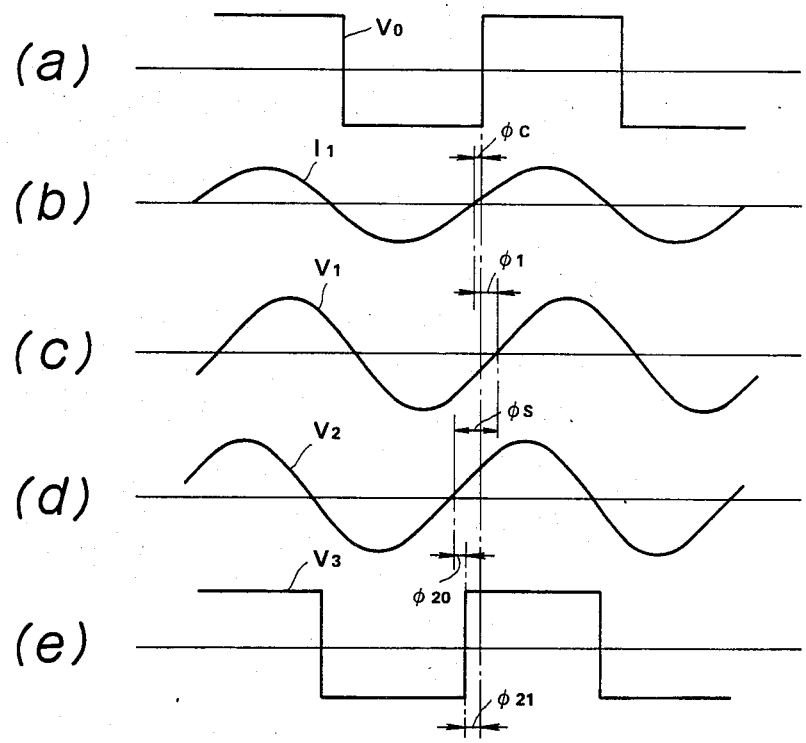
FIG. 2 is timing chart of signals produced in the gas pressure transducer shown in FIG. 1.

As shown in FIG. 1, the gas pressure transducer, generally indicated by the reference numeral 1, includes a pressure sensor 2 comprising a piezoelectric crystal and connected to a voltage stabilizer means 3 that comprises an AC constant-voltage driver 11 and a polarity discriminator 12 connected thereto. The AC constant-voltage driver 11 applies to the piezoelectric crystal 2 a constant-voltage AC signal $V_0$ having a rectangular waveform with a constant peak amplitude, as shown in FIG. 2(a). The polarity discriminator 12 serves to discriminate the polarity of an AC signal $V_2$ (shown in FIG. 2(d)) which is supplied from a phase shifter means 6 comprising a phase shifter 13. The polarity discriminator 12 has a trigger function to change the polarity of the constant-voltage AC signal $V_0$ according to the discriminated polarity of the AC signal $V_2$. The polarity discriminator 12 produces an output signal $V_3$ having a rectangular waveform, as shown in FIG. 2(e), which corresponds only to the polarity of the input voltage signal $V_2$, irrespective of the magnitude thereof.

The piezoelectric crystal 2 is also connected, at its output terminal, to a current-to-voltage converter means 4 comprising a current-to-voltage converter 14 which converts an alternating current $I_1$ (FIG. 2(b)) of a sine wave flowing through the piezoelectric crystal 2 into an AC voltage signal $V_1$ as shown in FIG. 2(c). The output terminal of the current-to-voltage converter 14 is connected to the phase shifter 13. The phase shifter 13 serves to shift the phase of the output voltage signal $V_1$ of the current-to-voltage converter 14 by $\phi s$ according to a condition described later. The phase shifter 13 is connected to the polarity discriminator 12 to supply the same with the AC voltage signal $V_2$ (FIG. 2(d)) which has been shifted $\phi s$ in phase with respect to the AC voltage signal $V_1$.

The piezoelectric crystal 2, the constant-voltage driver 11, the polarity discriminator 12, the phase shifter 13, and the current-to-voltage converter 14 jointly constitute a loop circuit for self-excited oscillation. The output terminal of the current-to-voltage converter 14 is also connected to an output means 5 comprising a rectifier 16 and an indicator 17 coupled thereto. The output voltage signal $V_1$ from the current-to-voltage converter 14 is a sine-wave AC voltage output with its amplitude variable as a function of the magnitude of the pressure of a gas applied to the piezoelectric crystal 2. The amplitude of the sine-wave AC voltage output is inversely proportional to the impedance of the piezoelectric crystal 2. The voltage signal $V_1$ is rectified in the full-wave rectification process by the rectifier 16 into a direct current, which is fed to the indicator 17 comprising a meter, for example, having pressure-indicating graduations for indicating the detected gas pressure. The output means 5 may be of any desired design. For example, it may be a printer or recorder for permanently recording gas pressure indications on a suitable medium, or may be arranged such that the output signal $V_1$ or the output signal from the rectifier 16 is directly used as a control signal for an actuator.

Oscillating conditions for the self-excited oscillation loop shown in FIG. 1 will be described below.

A phase condition is as follows: It is assumed here that the piezoelectric crystal 2 has a phase delay $\phi c$, the current-to-voltage converter 14 has a phase delay $\phi_1$, the polarity discriminator 12 has a phase delay $\phi_{20}$, the AC constant-voltage driver 11 has a phase delay $\phi_{21}$, and the phase shifter 13 is designed to produce a phase shift $\phi s$. Then, the following equation (I) can be established:

$$c + \phi_1 + \phi_2 + \phi_s = 0 \qquad (I)$$

where $\phi_2 = \phi_{20} + \phi_{21}$.

By selecting the phase shift $\phi_s$ by the phase shifter 13 so that the sum of the phase delays of the circuits except the piezoelectric crystal 2 meets:

$$|\phi_1 + \phi_2 + \phi_s| << 90° \qquad (II)$$

in the viciity of the resonant frequency of the piezoelectric crystal 2, we get from (I) and (II):

$$|\phi c| << 90°$$

The phase condition is thus given which is to be met for the piezoelectric crystal 2 to oscillate in the vicinity of the electrically series-resonant frequency.

A gain condition is as follows: The polarity discriminator 12 is responsive only to the polarity of its input signal, and the AC constant-voltage driver 11 issues an AC voltage having a constant peak amplitude. Therefore, the loop gain Gs at the time of starting oscillation is expressed by:

$$Gs >> 1$$

The gain condition that the loop gain Gc when the loop reaches its normal operation state be given as:

$$Gc = 1$$

can be met by gain adjustment capabilities of the AC constant-voltage driver 11 and the polarity discriminator 12.

Since the circuit of the present invention is a self-excited oscillation loop which produces oscillation in the viciity of the electrically series-resonant frequency, the oscillation starts immediately after the power supply is turned on. Even if the series-resonant frequency of the piezoelectric crystal 2 slightly changes, the phase condition remains substantially unaffected to allow the oscillation to continue stably.

Because the self-excited oscillation loop includes the piezoelectric crystal having extremely large Q, the oscillation frequency is less liable to be varied by extraneous noise, and any change in the impedance of the piezoelectric crystal 2 due to a variation of the resonant frequency is held to a minimum.

Figure 3:
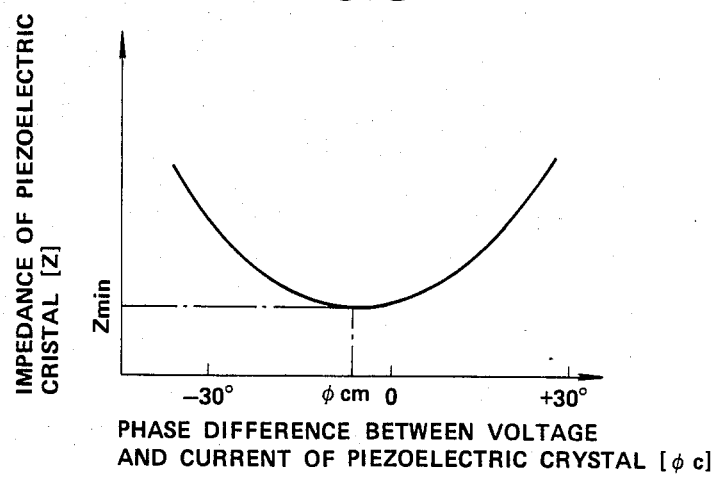
FIG. 3 is a graph showing a phase vs impedance curve of a piezoelectric crystal.

The phase difference $\phi c$ vs impedance curve of the piezoelectric crystal 2 in the pressure range of from 0 to 1,000 Torr is shown in FIG. 3. There is a phase difference $\phi cm$ corresponding to the minimum impedance within the phase range of from 0° to $-30°$. Therefore, by selecting the phase shift $\phi_s$ by the phase shifter 13 to be given by:

$$\phi_s = -(\phi cm + \phi_1 + \phi_2)$$

any change in the impedance can be minimized for improved stability even when the phase delays of the circuits except the piezoelectric crystal 2 are subjected to time-dependent changes, temperature-dependent changes, and disturbance noise. This can be achieved by selecting the phase shift $\phi_s$ by the phase shifter 13 so that the impedance of the piezoelectric crystal 2 is minimal or nearly minimal under the resonant condition. The "nearly minimal" impedance is an impedance in the phase range of from $+5°$ to $-30°$. Actually, the phase shift is selected to bring the impedance within a phase deviation of 1° from the phase $\phi cm$ at which the impedance is minimal.

Figure 4:
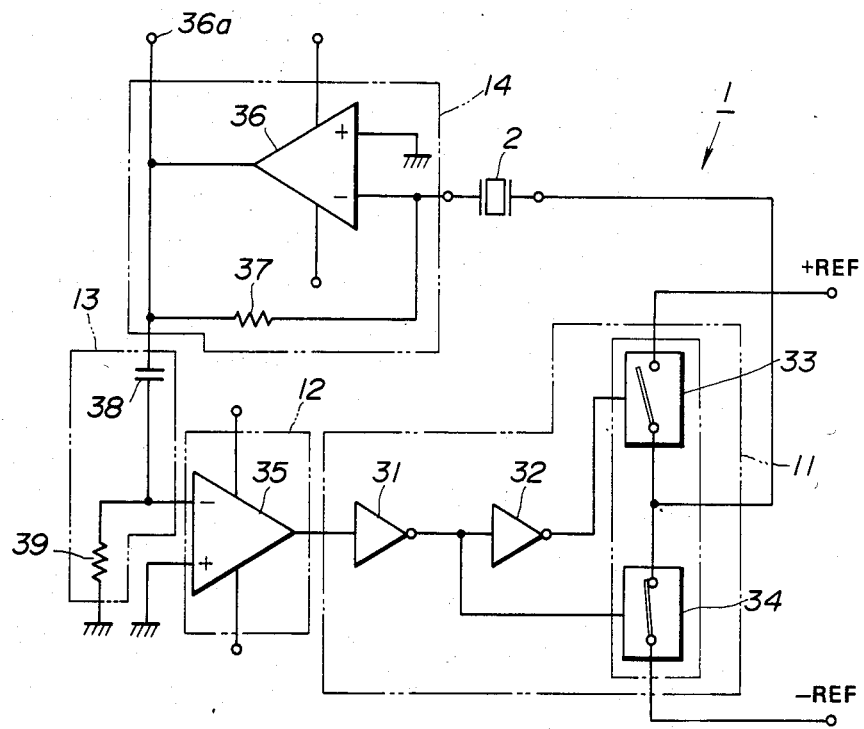
FIG. 4 is a circuit diagram of a specific circuit arrangement according to an embodiment of the present invention.

FIG. 4 shows a detailed electric circuit of the gas pressure transducer 1 of the present invention. Those parts in FIG. 4 which are identical to those shown in FIG. 1 are denoted by identical reference numerals. The timing chart of FIG. 2 can be used as a timing chart of signals produced in the circuit of FIG. 4 by inverting the waveforms of FIGS. 2(c) and 2(d) by 180°.

The AC constant-voltage driver 11 is supplied with positive and negative constant voltages +REF, −REF and applies an AC constant-voltage signal to the piezoelectric crystal 2 through switching operation of analog switches 33, 34 controlled via series-connected inverters 31, 32. The polarity discriminator 12 comprises a comparator 35 having one input at zero level. The comparator 35 applies its output signal to the inverter 31. The current-to-voltage converter 14 is in the form of an active device comprising an operational amplifier 36 and a feedback resistor 37 connected across the operational amplifier 36, for converting the current flowing through the piezoelectric crystal 2 into the voltage. The phase shifter 13 is an RC circuit comprising a capacitor 38 connected between the output terminal of the operational amplifier 36 and an input terminal of the comparator 35 and a resistor 39 connected between the intput terminal of the comparator 35 and ground. The phase shift achieved by the phase shifter 13 can be determined by the combination of the reactance of the capacitor 38 and the resistance of the resistor 39. The output terminal of the operational amplifier 36 is connected to an output terminal 36a for connection to the rectifier 16.

Figure 5:
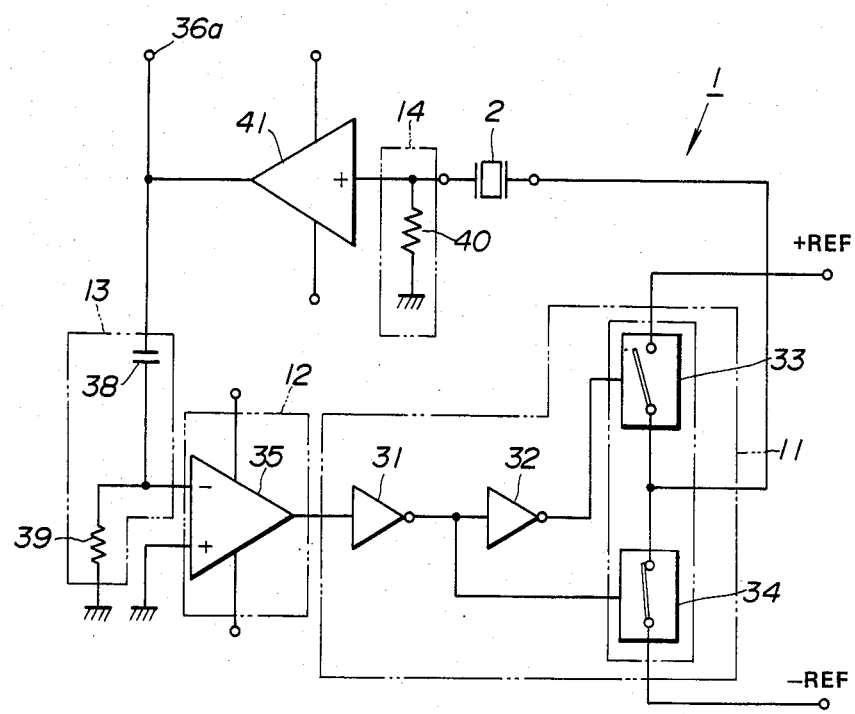
FIG. 5 is a circuit diagram of a specific circuit arrangement according to another embodiment of the present invention.

FIG. 5 shows an electric circuit according to another preferred embodiment of the present invention. Those parts in FIG. 5 which are identical to those shown in FIG. 4 are denoted by identical reference numerals, and will not be described in detail. The circuit arrangement of FIG. 5 differs from that of FIG. 4 in that while the circuit of FIG. 4 employs an active device as a current-to-voltage converter 14, the circuit of FIG. 5 employs a passive device instead. More specifically, a resistor 40 is connected between the output terminal of the piezoelectric crystal 2 and ground. A voltage produced across the resistor 40 by an output current from the piezoelectric crystal 2 is followed by the output voltage of a voltage follower 41. The overall operation of the embodiment shown in FIG. 5 is the same as that of the embodiment of FIG. 4.

Figure 6:
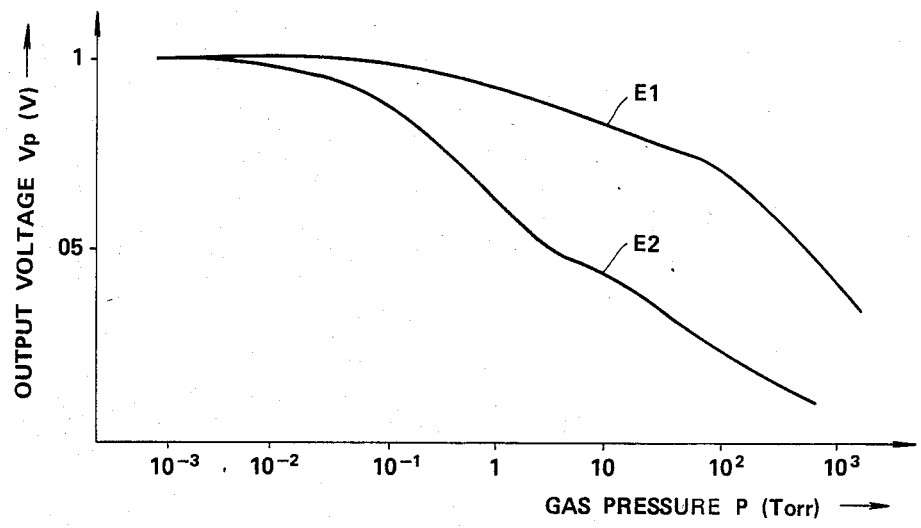
FIG. 6 is a graph illustrating output voltages, plotted against gas pressures, of rectifiers in FIGS. 4 and 5.

FIG. 6 illustrates output voltages Vp of the rectifiers 16 in the circuit shown in FIG. 1 when conected to circuits having the cofigurations shown in FIGS. 4 and 5, plotted against the pressure P of the gas in which the piezoelectric crystal 2 is placed. The output voltage curve E1 is obtained from the circuit of FIG. 5, whereas the output voltage curve E2 is from the circuit of FIG. 4. These output voltage curves E1, E2 show that once an output voltage Vp is known, a corresponding gas pressure P can uniquely be determined. Comparison of the curves E1, E2 indicates that the voltage Vp of the embodiment of FIG. 5 (E1) is more dependent on the pressure in a relatively high pressure range, and the voltage Vp of the embodimemnt of FIG. 4 (E2) is more dependent on the pressure in a relatively low pressure range. Therefore, the arrangement of FIG. 4 is more effective in measuring lower gas pressures, whereas the arrangement of FIG. 5 is more effective in measuring higher gas pressures.

In any of the foregoing embodiments, since the pressure-dependency of the piezoelectric crystal 2 is utilized, the gas pressure transducer can measure absolute pressures. The gas pressure transducer is quick in response, less subject to aging, and stable in operation inasmuch as it has a self-excited oscillation loop. The circuit of the gas pressure transducer is simple in structure and can easily and inexpensively be manufactured. The gas pressure transducer can be used widely as a pressure monitor for process control in the chemical industry and as other pressure measurement means.

Figure 7:
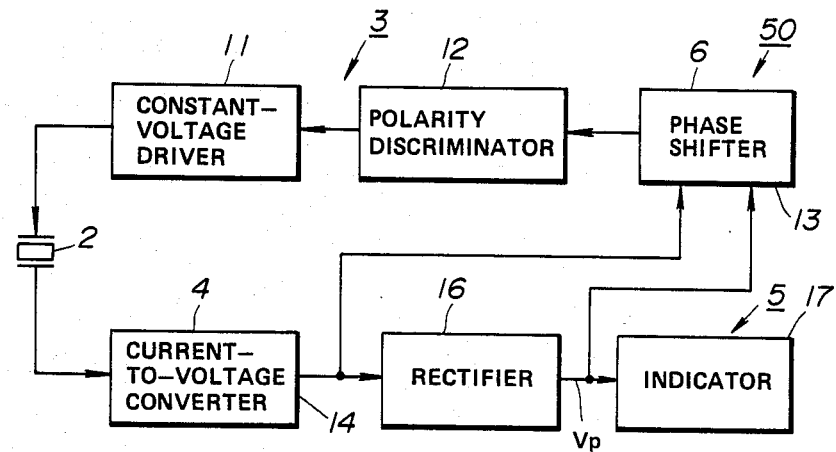
FIG. 7 is a block diagram of a gas pressure transducer according to a modification of the present invention.

FIG. 7 shows a modification of the present invention. Those components in FIG. 7 which are identical to those of FIG. 1 are designated by identical reference numerals and will not be described in detail. A gas pressure transducer, generally denoted at 50 in FIG. 7, is quite similar to that of FIG. 1, except that the output signal Vp from the rectifier 16 is applied to the phase shifter 13 to adjust the phase shift s by the phase shifter 13. The phase shift s can be set highly accurately with respect to the phase difference $\phi$cm that varies with the pressure.

As still another embodiment, a monitor means for monitoring the phase $\phi$c of the piezoelectric crystal 2 may be provided for adjusting the phase shift $\phi$s. According to these embodiments, variations in the impedance of the piezoelectric crystal 2 can be tracked more stably and accurately.

Figure 8:
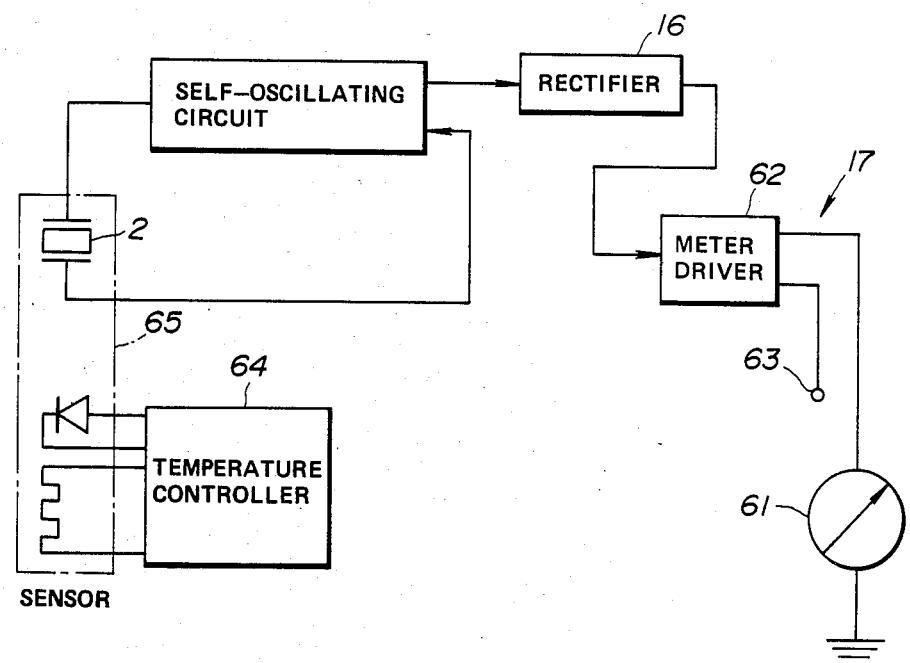
FIG. 8 is a block diagram of a gas pressure transducer of the present invention, with an auxiliary circuit added.

FIG. 8 illustrates a gas pressure measuring system with an auxiliary circuit added. Those components in FIG. 8 which are identical to those of FIG. 1 are designated by identical reference numerals. The indicator 17 comprises a meter 61 for indicating analog or digital data, and a meter driver 62 for actuating the meter 61. The meter driver 62 has an output terminal 63 for connection to a recorder or the like. A temperature controller 64 is connected to a heating bath 65 housing the piezoelectric crystal 2 to keep the temperature in the heating bath 65 at about 50° C. for reducing measurement errors arising from ambient temperature changes.

The blocks in each illustrated block diagram may comprise other functionally equivalent electric circuits than those shown in the electric circuit diagrams.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A gas pressure transducer for measuring the pressure of a gas from the impedance of a piezoelectric crystal placed in the gas, comprising:
   voltage stabilizer means for supplying the piezoelectric crystal with an AC constant-voltage signal corresponding to an applied AC signal and having a constant peak amplitude;
   current-to-voltage converter means for converting an alternating output current from the piezoelectric crystal into an output voltage signal;
   phase shifter means for shifting the phase of said output voltage signal from said current-to-voltage converter means so that the impedance of the piezoelectric crystal is minimal or nearly minimal and for supplying the shifted voltage signal to said voltage stabilizer means; and
   output means for issuing out said output voltage signal from said current-to-voltage converter means as a function of the pressure of the gas.

2. A gas pressure transducer according to claim 1, wherein said voltage stabilizer means comprises a polarity discriminator for discriminating the polarity of the applied signal and a constant-voltage driver responsive to a polarity signal from said polarity discriminator for switching a constant voltage to produce said AC constant-voltage signal.

3. A gas pressure transducer according to claim 1, wherein said current-to-voltage converter means comprises an active device for producing a voltage proportional to the alternating output current from the piezoelectric crystal.

4. A gas pressure transducer according to claim 1, wherein said current-to-voltage converter means comprises a resistor for producing a voltage drop thereacross which is propotional to the alternating output current from the piezoelectric crystal.

5. A gas pressure transducer according to claim 1, wherein said phase shifter means comprises a resistor and a reactive element connected thereto.

6. A gas pressure transducer according to claim 1, wherein said output means comprises a rectifier and an indicator connected thereto.

* * * * *

UNITED STATES PATENT AND TRADEMARK OFFICE
CERTIFICATE OF CORRECTION

PATENT NO. : 4,684,842
DATED : August 4, 1987
INVENTOR(S) : Naohiko Maruno et al It is certified that error appears in the above-identified patent and that said Letters Patent are hereby corrected as shown below:

Column 5, line 1, should read: $--\phi c+\phi_1+\phi_2+\phi s=0--$

Column 6, line 63, "embodimemnt" should read --embodiment--.

Signed and Sealed this

Fifteenth Day of December, 1987

Attest:

DONALD J. QUIGG

Attesting Officer    Commissioner of Patents and Trademarks